United States Patent [19]
Saynor et al.

[11] Patent Number: 6,157,427
[45] Date of Patent: Dec. 5, 2000

[54] OPTICAL DEVICE WITH COMBINED ALIGNMENT AND ANISOTROPIC LAYERS

[75] Inventors: Kirstin Ann Saynor, Newnham; Martin David Tillin, Abingdon; Michael John Towler, Botley; Lesley Anne Judge, Bedford, all of United Kingdom

[73] Assignee: Sharp Kabushiki Kaisha, Osaka, Japan

[21] Appl. No.: 09/108,559

[22] Filed: Jul. 1, 1998

[30] Foreign Application Priority Data

Jul. 3, 1997 [GB] United Kingdom ............... 9713981

[51] Int. Cl.⁷ ............... G02F 1/1337; G02F 1/1335
[52] U.S. Cl. ............... 349/123; 349/117; 349/128; 349/129
[58] Field of Search ............... 349/123, 127, 349/129, 117, 74, 128

[56] References Cited

U.S. PATENT DOCUMENTS

| | | | |
|---|---|---|---|
| 5,073,294 | 12/1991 | Shannon et al. | 252/299.01 |
| 5,249,070 | 9/1993 | Takano | 359/54 |
| 5,368,770 | 11/1994 | Saupe et al. | 252/299.01 |
| 5,568,294 | 10/1996 | Lee | 359/73 |
| 5,760,859 | 6/1998 | Bosma et al. | 349/75 |
| 5,770,107 | 6/1998 | Hassall et al. | 252/299.6 |
| 5,953,091 | 9/1999 | Jones et al. | 349/129 |
| 5,965,691 | 10/1999 | Gibbons et al. | 349/123 |
| 5,976,640 | 11/1999 | Yu et al. | 349/123 |

FOREIGN PATENT DOCUMENTS

| | | |
|---|---|---|
| 0423881 | 4/1991 | European Pat. Off. . |
| 0689084 | 12/1995 | European Pat. Off. . |
| 3-134622 | 6/1991 | Japan . |
| 4-043318 | 2/1992 | Japan . |
| 5-088150 | 4/1993 | Japan . |
| 2306016 | 4/1997 | United Kingdom . |

OTHER PUBLICATIONS

H.G. Walton et al.; U.S. Patent Application Serial No. 09/035,350; Filed on Mar. 5, 1998.

H.G. Walton et al.; U.S. Patent Application Serial No. 08/880,455; Filed on Jun. 23, 1997, Now US Pat 5,880,798.

*Primary Examiner*—William L. Sikes
*Assistant Examiner*—Tarifur R. Chowdhury
*Attorney, Agent, or Firm*—Renner, Otto, Boisselle & Sklar LLP

[57] ABSTRACT

An optical device of the present invention, includes: an anisotropic layer containing anisotropic molecules, and an alignment layer adjacent the anisotropic layer. The alignment layer serves to align the anisotropic molecules in an adjacent surface region of said anisotropic layer. The alignment layer also includes a twisted molecular structure so as to define a twisted optical retarder.

21 Claims, 12 Drawing Sheets

OPTICAL DEVICE WITH COMBINED ALIGNMENT AND ANISOTROPIC LAYERS

BACKGROUND OF THE INVENTION

1. Field of the Invention

This invention relates to an optical device of the multilayer type including an anisotropic layer containing anlsotropic molecules, and an alignment layer which is disposed adjacent the anisotropic layer and which serves to align the anisotropic molecules in an adjacent surface region of the anisotropic layer.

2. Description of the Related Art

It is well known to provide an alignment layer for aligning anisotroplc molecules in an adjacent surface region of an anisotropic layer, e.g. liquid crystal molecules in a liquid crystal layer. Such an alignment layer is very often made from polyimide which requires a high temperature bake for a few hours and a number of rubs with a soft pile cloth. Long, high temperature bakes may adversely affect layers below the alignment layer, and the rubbing may introduce dust and dirt into the device. Thus, it is advantageous to minimize the number of such alignment layers in a multilayer optical device.

EP-A-0689084 discloses the use of a photosensitive material to form an alignment layer, such material being altered using polarized UV radiation to form an alignment layer in which the alignment direction is determined by the direction of polarization of the UV radiation. EP-A-0689084 discloses a number of optical devices in which one or more such alignment layers (or conventional alignment layers) are used to align liquid crystal molecules in an adjacent anisotropic layer variously to produce optical retardation, for example from uniaxial (non-twisted) and twisted or chiral birefringent structures.

SUMMARY OF THE INVENTION

According to one aspect of the present invention, an optical device includes, an anisotropic layer containing anisotropic molecules, and an alignment layer adjacent the anisotropic layer. The alignment layer serves to align the anisotropic molecules in an adjacent surface region of said anisotropic layer. The alignment layer also includes a twisted molecular structure so as to define a twisted optical retarder.

In one embodiment of the invention, the twisted molecular structure is provided by incorporating chiral molecules into the alignment layer.

In another embodiment of the invention, the twisted molecular structure is provided by incorporating a chiral dopant into the alignment layer.

In still another embodiment of the invention, the alignment layer comprises polymerized reactive mesogens having a twist.

In yet another embodiment of the invention, the anisotropic layer is a liquid crystal layer.

In yet embodiment of the invention, the liquid crystal layer contains a chiral moiety.

In yet another embodiment of the invention, the liquid crystal layer contains a dichroic dye.

In yet another embodiment of the invention, the liquid crystal layer is a layer in which the liquid crystal molecules are fixed.

In yet another embodiment of the invention, the liquid crystal layer is a layer in which the liquid crystal molecules are moveable in response to changes in a field applied thereto.

In yet another embodiment of the invention, the anisotropic layer is a layer in which the anisotropic molecules are fixed.

In yet another embodiment of the invention, the anisotropic layer is a layer in which the anisotropic molecules are moveable in response to changes in a field applied thereto.

In yet another embodiment of the invention, the anisotropic layer is a further alignment layer.

In yet another embodiment of the invention, the optical device further includes a further anisotropic layer which is provided over and is aligned by said further alignment layer.

In yet another embodiment of the invention, the further alignment layer is arranged to act as an optical retarder.

In yet another embodiment of the invention, the molecules of the twisted molecular structure at opposite surfaces of the alignment layer have different pre-tilt angles.

In yet another embodiment of the invention, the alignment layer is formed from polymerized reactive mesogens having different polymerization functionalities.

In yet another embodiment of the invention, the reactive mesogens comprise a mixture of mono- and di-functional polymerizable liquid crystals.

In yet another embodiment of the invention, the optical device further includes means for applying a field to the liquid crystal layer.

In yet another embodiment of the invention, the optical device further includes means for applying a field to the anisotropic layer.

In yet another embodiment of the invention, the optical device further includes a polarizer disposed on at least one side of the anisotropic layer.

In yet another embodiment of the invention, the optical device further includes a reflector.

Thus, in the alignment layer of the present invention, the projection of the surface director onto the plane of the interface between the alignment layer and the anisotropic layer is non-parallel to the projection onto the same plane of the director at some other point within the depth of the alignment layer. The "surface director" is the direction of extent of the molecules at the surface under consideration.

As noted above, in the present invention the twisted molecular structure may be provided by incorporating chiral molecules or a chiral dopant in the alignment layer. In a convenient embodiment, the alignment layer comprises polymerized reactive mesogens (polymerized liquid crystal monomers/pre-polymers) having a twist. Any degree of twist from greater than 0° upwards, depending upon the requirements of the optical device, can be introduced into the alignment layer.

Also as noted above, the anisotropic layer may be a liquid crystal layer which may be twisted or untwisted. The liquid crystal layer may be a layer in which the liquid crystal molecules are fixed or it may be one in which the liquid crystal molecules are moveable in response to changes in an electrical or magnetic field applied thereto. Alternatively as noted above, the anisotropic layer may be a further alignment layer which may be used to align a further anisotropic layer and which may itself also be arranged to act as an optical retarder.

Thus, the invention described herein makes possible the advantage of providing an optical device in which the number of layers can be reduced so as to simplify fabrication of the device.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

Embodiment 1

Figure 1:
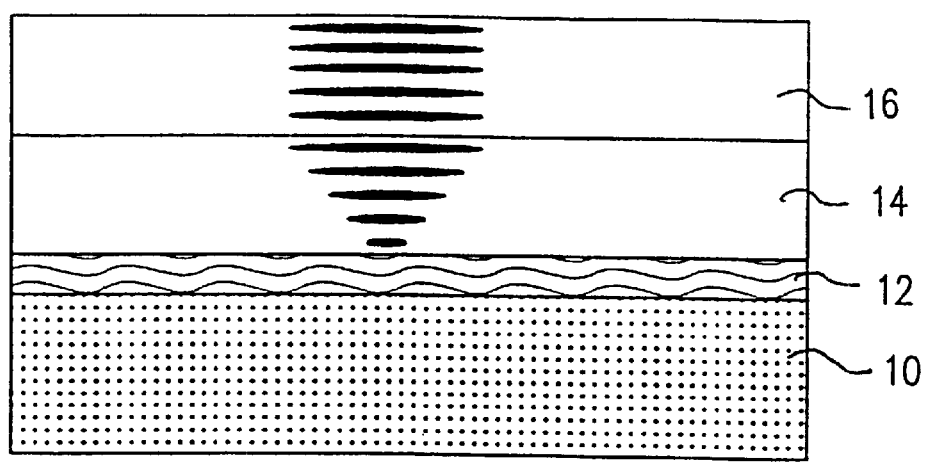
FIG. 1 is a schematic illustration of the layer structure of an optical device according to one embodiment of the present invention.

Referring now to FIG. 1, the optical device comprises a substrate 10, a first alignment layer 12, a second alignment layer 14, and an anisotropic layer 16 on the second alignment layer 14. The first alignment layer 12 is a conventional alignment layer which is formed, for example, of a rubbed polyimide in a per se known way. The second alignment layer 14 can be formed, for example, by spin coating such layer from a solvent such as toluene. The molecules in the layer 14 at the interface with the layer 12 takes up the alignment of the letter. The layer 14 is typically formed from a reactive mesogen (polymerizable liquid crystal) containing a chiral dopant which induces a twist in the alignment layer 14. The thickness (and hence the twist) of the alignment layer 14 is controlled by the spin speed and concentration of the reactive mesogen in the solvent. The thickness to pitch ratio of the mixture forming the alignment layer also determines the twist of the layer for any given layer thickness, which is determined by the concentration and chirality of the chiral dopant, or by the chirality of the reactive mesogen itself (if the latter is inherently chiral). The alignment layer 14 may then be polymerized either by thermal or photo-polymerization, depending upon the nature of the reactive mesogen. By using these control parameters, the layer 14 may have such a twist and thickness that the surface director in the layer 14 at the interface with the layer 16 is at the desired azimuthal angle whilst at the same time producing the desired optical retardation of light passing through the layer 14.

The anisotropic layer 16 may be coated in a similar manner to that described above for layer 14 except that, in this case, the layer 16 has an untwisted molecular structure. Thus, the anisotropic layer 16 may be produced by spin coating from solution and subsequent polymerization if a polymer layer is required. Before polymerization, the surface molecules in the layer 16 at the interface with the layer 14 take up the alignment of the surface director in the latter. Alternatively, the substrate 10 with alignment layers 12 and 14 could be combined with another substrate coated with some other alignment layer or layers to form a display which can be filled with liquid crystal material so that the latter defines other interface, takes up the alignment of the adjacent alignment layer on the other substrate.

Figure 1A:
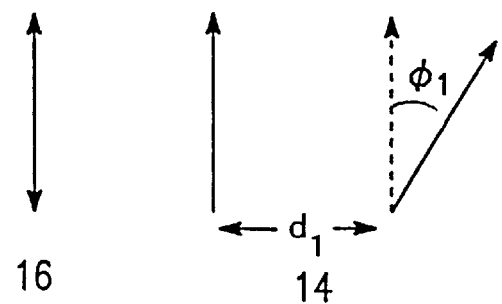
FIG. 1A is a schematic illustration indicating optical transmission through the device of FIG. 1.

FIG. 1A schematically illustrates optical transmission through an example of the optical device of FIG. 1 wherein the anisotropic layer 16, which may be a dyed polymerized reactive mesogen layer, acts as a linear polarizer, and the layer 14 has a twist $\phi_1$, a thickness $d_1$ and a birefringence such that it behaves as a quarter wave plate. Thus, in use, the layer 16 linearly polarized incident light which is then converted into circularly polarized light by the layer 14 acting as a quarter wave plate.

In one example, the values of the twist $\phi_1$ and the thickness $d_1$ necessary to create a retarder which behaves like a quarter wave plate at a wavelength of 550 nm for a material with a birefringence of 0.189 at that wave-length are 63.64° and 1027 nm, respectively.

In a modification of the above, the twist $\phi_1$ and thickness $d_1$ of the layer 14 are adjusted such that the retarder behaves like a half wave plate so as to effect azimuthal rotation of the incident linearly polarized light from the layer 16. For a material having a birefringence of 0.189, the twist and thickness values necessary to rotate linearly polarized light through an angle of 30° are 30° and 2869 nm, respectively. These values are equivalent to the first minimum condition for a 30° TN layer. However, the values of the twist $\phi_1$, and the thickness $d_1$, can be adjusted to ensure a rotation of the polarization direction of linearly polarized light to any desired angle.

Embodiment 2

Figure 2:
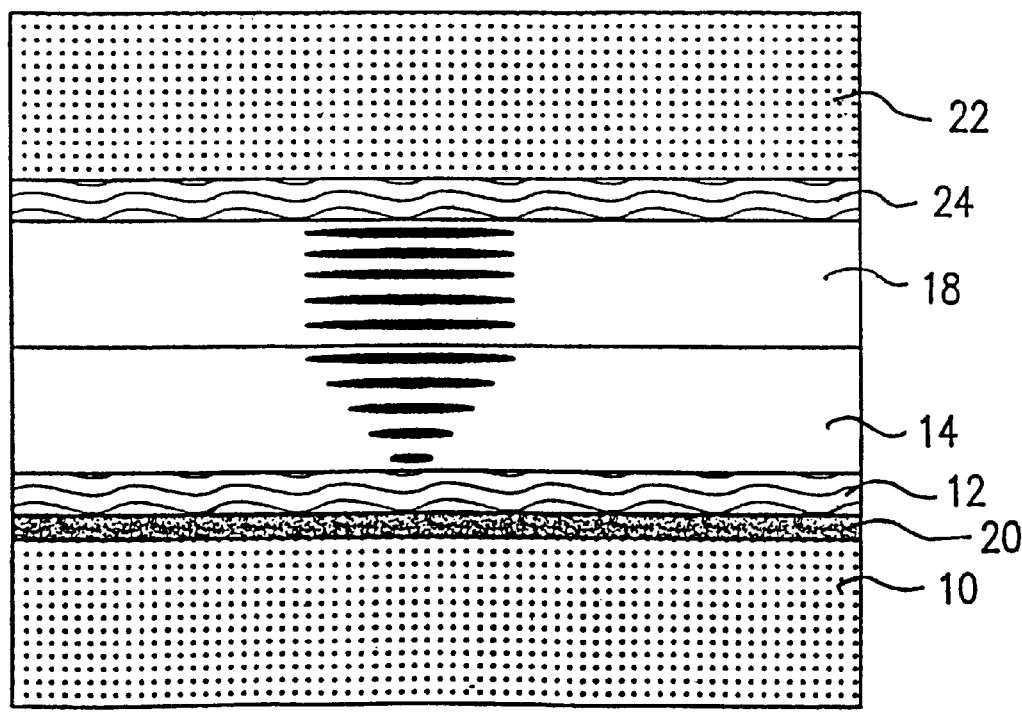
FIGS. 2 and 2A are illustrations similar to those of FIGS. 1 and 1A for a second embodiment of optical device according to the present invention.
Figure 2A:
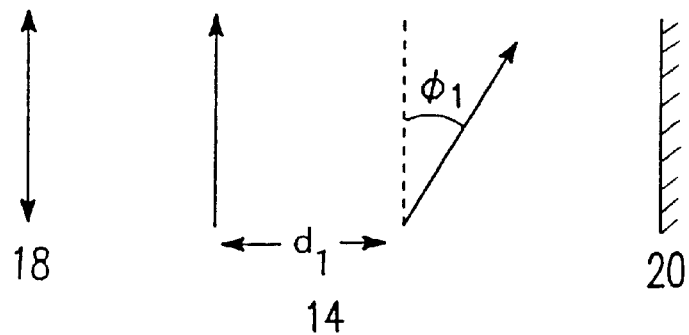

Referring now to FIG. 2, a field-switchable dark/bright reflective device is provided by replacing the dyed, polymerized reactive mesogen layer 16 with a field-switchable liquid crystal layer 18 containing a dichroic dye and by providing a reflector 20 on the opposite side of the layer 14 to the layer 18. The layer 14 acts as a quarter wave retarder and also as an alignment layer for the liquid crystal layer 18, as described for the embodiment of FIG. 1. The device of FIG. 2 also includes a further substrate 22 with further rubbed alignment layer 24 and with a per se known means (not shown) for applying an electric field to the switchable liquid crystal layer 18. FIG. 2A schematically illustrates optical transmission through an example of the optical device of FIG. 2.

Embodiment 3

Figure 3:
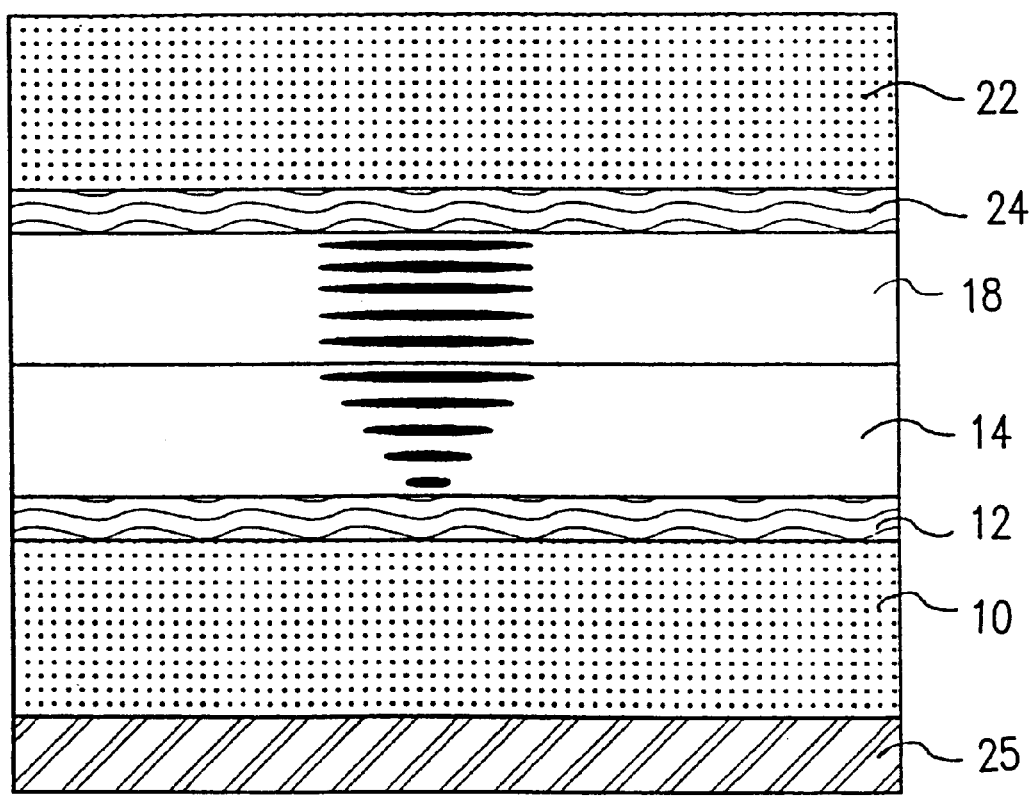
FIG. 3 shows a modification of the optical device of FIG. 2.

Referring now to FIG. 3, the device illustrated therein is similar to that of FIG. 2 except that it is a transmissive device rather than a reflective device. As a result of this, the alignment layer 14 is formed as a half wave plate, the reflector 20 is dispensed with, and a linear polarizer 25 is provided on the opposite side of the substrate 10 to the layers 12 and 14. The transmission axis of the polarizer 25 is orientated at 90° the twist angle of the layer 14 to the transmission axis of the dyed liquid crystal layer 18. The device is dark when no field is applied to the liquid crystal, and bright when a voltage is applied (light absorption in the layer 18 is field-dependent).

Embodiment 4

Figure 4:
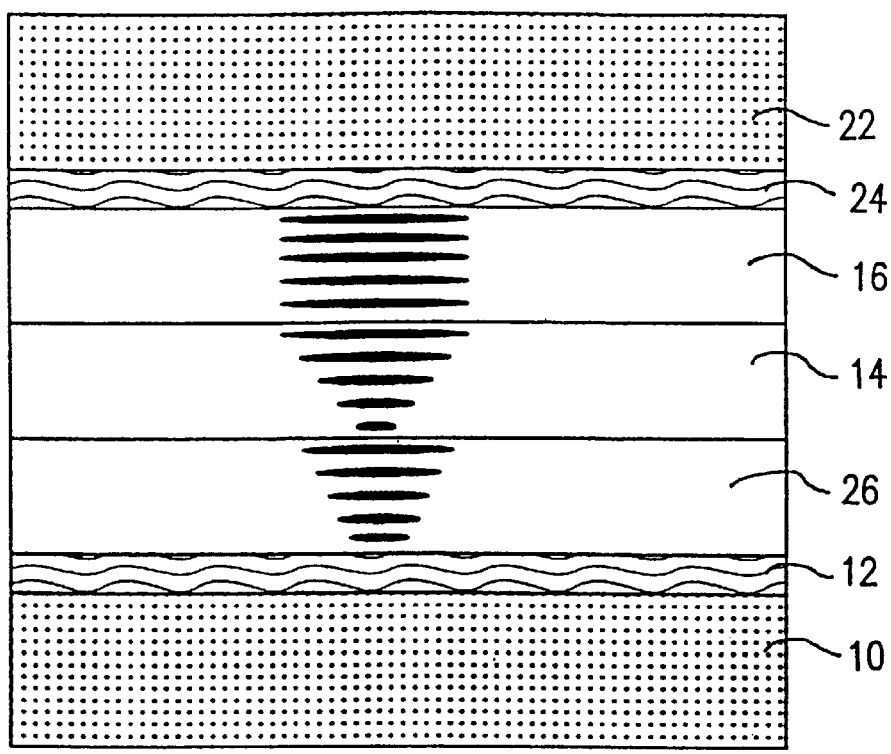
FIGS. 4 and 4A are views similar to FIGS. 1 and 1A of a further embodiment of optical device according to the present invention.
Figure 4A:
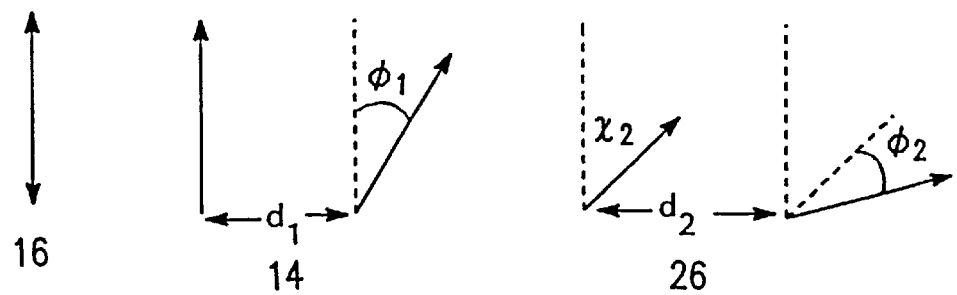

Referring now to FIG. 4, the optical device illustrated therein is intended to serve the function of an achromatic circular polarizer. The device comprises layers 14 and 16 which are broadly of the type described above with reference to FIG. 1, with an additional retarder layer 26 which is of a similar general type to layer 16. This additional retarder 26, however, is arranged with its surface director oriented at an azimuthal angle $\chi_2$ which is other than zero with respect to the surface director of the layer 14. In this regard, it is to be understood that the opposite surface director of the layer 14 in FIG. 4 is azimuthally aligned with the polarization axis of the layer 16, as is also the case with the device of FIG. 1. The layer 26 has a twist $\phi_2$. In this embodiment, the layer 14 is formed so as to be aligned by the layer 16, and this combination is then placed on top of the previously-formed layer 26. Thus, the layer 14 neither aligns, nor is aligned by, the layer 26. The optical transmission of this device is illustrated schematically in FIG. 4A.

In the device of FIG. 4, it will be understood that the layers 14, 16 and 24 are provided on the substrate 22, whilst the layers 12 and 26 are provided on the substrate 10, and then these two structures are laminated together. This procedure may require the need of some interfacial fluid (index matching fluid or polymerizable adhesive, also of a suitable refractive index). The substrates 10 and 22 may be of glass or plastics. Once the device as illustrated in FIG. 4 has been assembled, one or both of the substrates 10 and 22 may be removed. For example, one of both of the substrates 10 and 22 could be a polymer release film which can be peeled off once the device is otherwise complete. This has the advantage of leaving a thin, free-standing optical element which could be incorporated into some other device. The use of one or more removable substrates applies to any of the other passive (non-switchable) examples of optical element described herein.

In an alternative embodiment, the additional aligning retarder layer 26 is untwisted, i.e. $\phi_2$ is zero.

In a particular example, the achromatic circular polarizer has layer 14 with a twist $\phi_1$ and a thickness $d_1$ of 28.4° and 1922 nm, respectively, and the additional layer 26 is an untwisted layer ($\phi_2=0°$) having a thickness $d_2$ of 569 nm oriented so that its optic axis is rotated azimuthally, $\chi_2$, by 78.6° with respect to the polarization axis of the layer 16 which acts as a linear polarizer.

In another example, the achromatic circular polarizer has the layer 26 with a twist $\phi_2$ of 20° and a thickness $d_2$ of 575 nm, and with the surface director of the layer 26 being rotated at an angle $\chi_2$ of 67° relative to the transmission axis of the layer 16, the layers 14 and 16 being as described in the previous paragraph.

Embodiment 5

Figure 5:
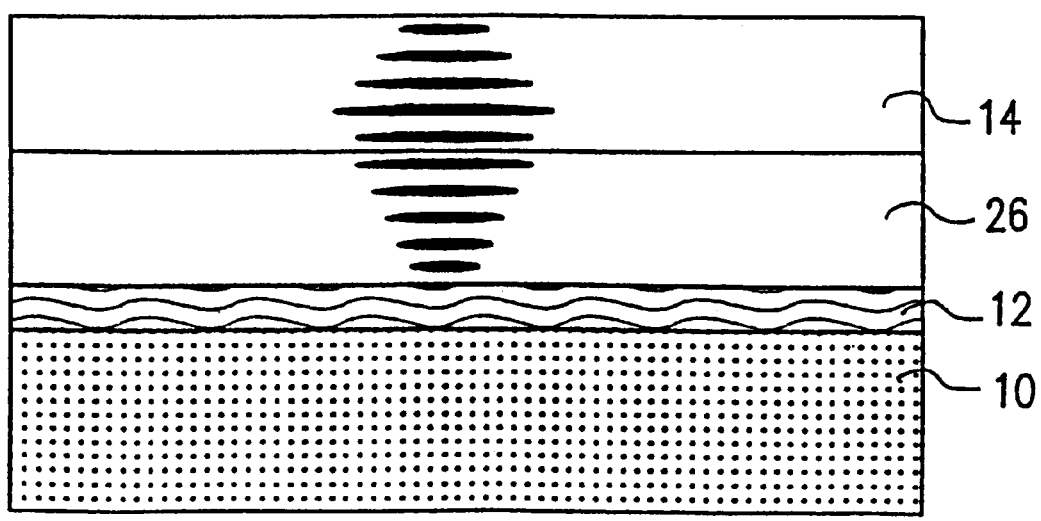
FIG. 5 is a schematic illustration of the layer structure of another embodiment of optical device according to the present invention.

Referring now to FIG. 5, the optical element illustrated therein differs from those of the previous embodiments in that layer 16 is dispensed with and contiguous layers 14 and 26 are both formed from chiral reactive mesogen compositions. The layer 26 serves to align the layer 14 and also acts as an optical retarder.

Embodiment 6

Figure 6:
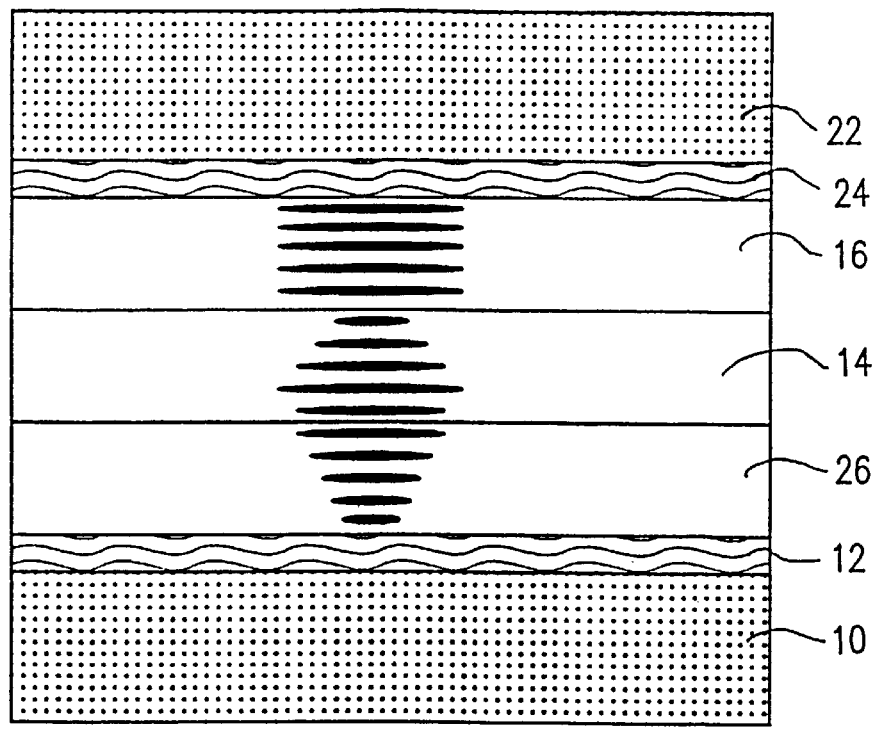
FIGS. 6 and 6A are illustrations similar to those of FIGS. 1 and 1A for a still further embodiment of optical device according to the present invention.
Figure 6A:
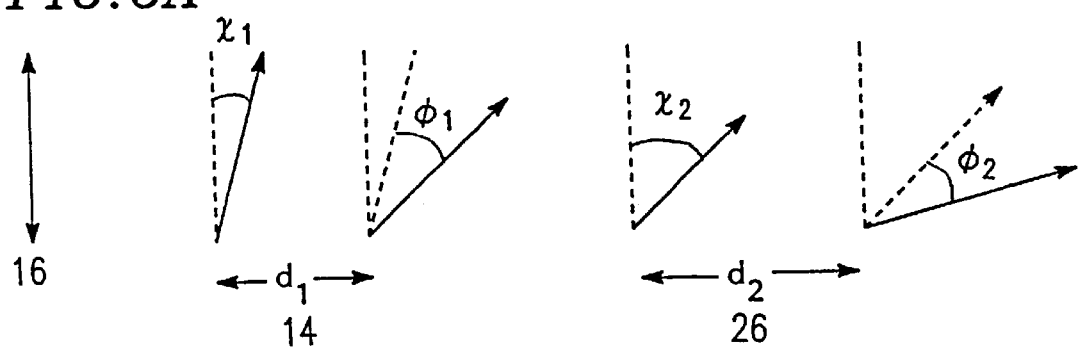

Referring now to FIGS. 6 and 6A, the optical device illustrated therein is an achromatic circular polarizer. In this device, layer 14 is azimuthally rotated at angle $\chi_1$ relative to the polarization axis of anisotropic layer 16 acting as a linear polarizer and is aligned by layer 26. This is effected by forming the layer 14 on the previously formed layer 26. The layer 14 does not align the layer 16 which is separately formed on the substrate 22 with the aligning layer 24.

In the optical device of FIG. 6, both of the layers 14 and 26 are twisted. However, either of these may be untwisted if desired. In one example of this latter type of device, layer 26 is twisted and aligns layer 14 which is untwisted. The arrangement is such that $\chi_1=15°$, $d_1=980$ nm, $\phi_2=85.5°$, $d_2=920$ nm and $\chi_2=15°$.

Embodiment 7

Figure 7:
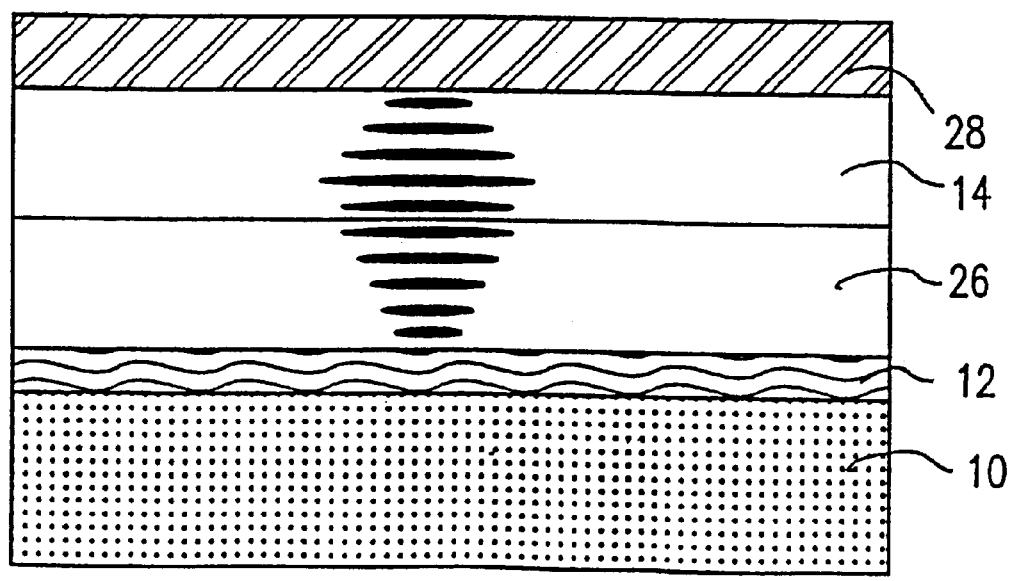
FIG. 7 is a schematic illustration of the layer structure of another embodiment of optical device according to the present invention.

In the optical device of FIG. 7, the arrangement is similar to that of FIG. 6 except that it uses a conventional linear polarizer 28 instead of the anisotropic layer 16 serving the same function.

Example 1

An optical device with an untwisted layer 14 was constructed in accordance with the above described embodiment in the following manner. Note: the layers in the below example were fabricated in the reverse order, in relation to the layers as described above, as this was easier to achieve.

An alignment layer PI2555 (manufactured by DuPont) was spun onto a piece of flat glass and rubbed with a pile deformation of about 0.3 mm. A reactive mesogen RM257 (manufactured by E. Merck) was dissolved into a solvent mixture in the ratio of 1 part to 3 parts w/w. The solvent was composed of 20% xylene and 80% toluene, 3% photoinitiator, D4265 (manufactured by Ciba Geigy), was added to the RM257 before it was dissolved in the solvent. The resulting solution was spun onto the PI2555 coated glass substrate at a temperature 85° C. (both the solution and the substrate) at 3740 rpms for 40 seconds. The resulting RM257 layer was allowed to align for 30 seconds at 85° C. before being polymerized by Uv light at a temperature of 85° C. This produced an untwisted anisotropic polymer layer with a retardation of 185 nm.

A further layer was formed on top of this layer as follows. 2.1% w/w of CB15 (manufactured by E. Merck) was dissolved with RM257 and 3% D4265. This compound was then dissolved in the above-described solvent mixture at a ratio of 1 part RM257 mixture to 3 parts solvent. The solvent mixture was then spin coated onto the first RM257 layer at 4300 rpms for 40 seconds at a temperature of 85° C. The second RM257 layer was allowed to align at 85° C. for 20 seconds before being polymerized with UV light at 85° C. The resulting twisted anisotropic polymer layer had an effective retardation (d·Δn) of about 174 mm.

Figure 13:
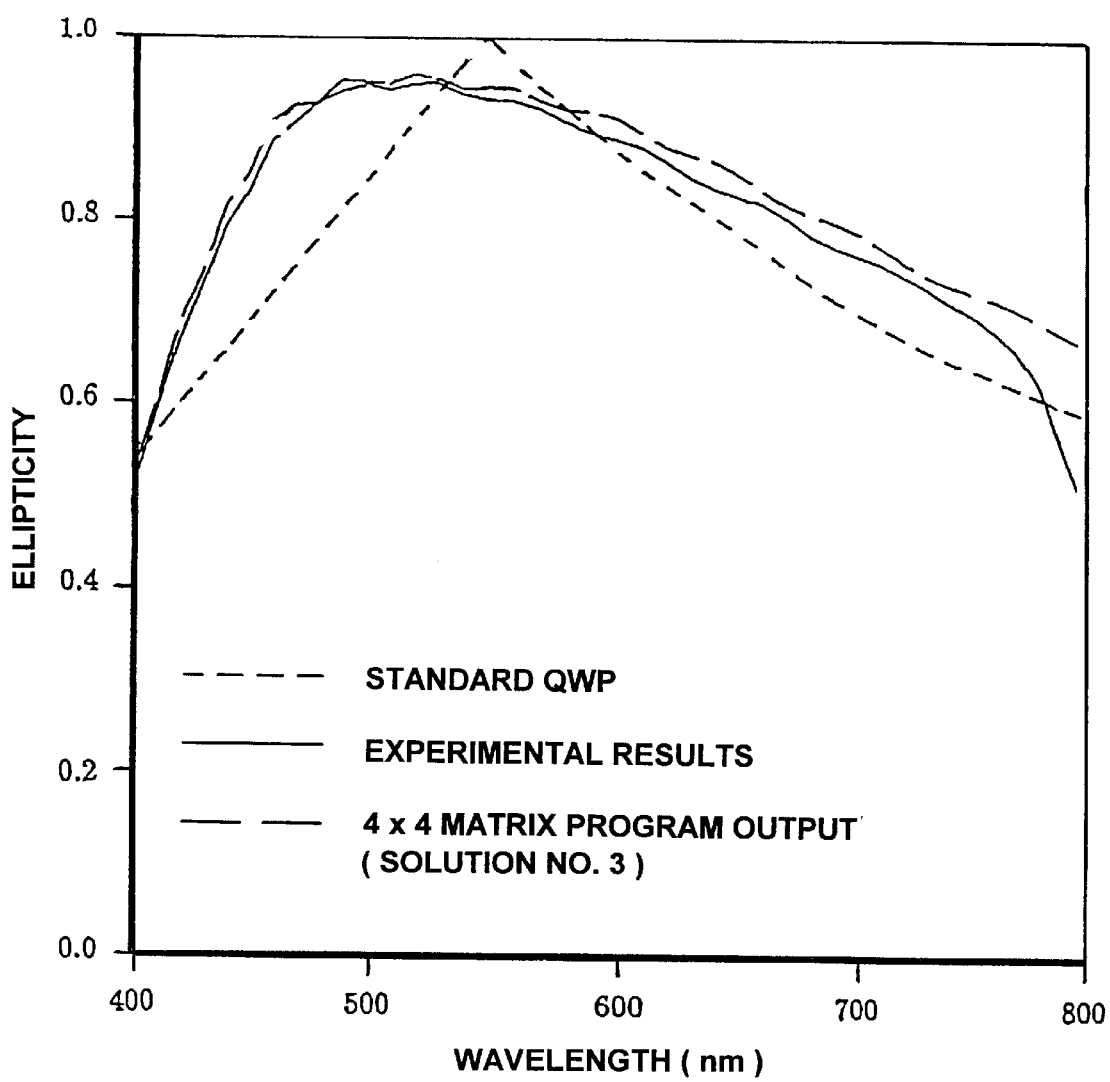
FIG. 13 is a comparative graphical representation of the ellipticity and values calculated using a 4×4 optical transfer matrix method for an optical device made in accordance with Example 1 of the present invention versus a single layer quarter wave length retarder.

After orienting the fabricated achromatic circular polarizer with the director of the untwisted layer at 15° to the polarization azimuth of linearly polarized light, the ellipticity of the structure was measured. The results of these measurements are shown in FIG. 13, along with the values calculated using a 4×4 optical transfer matrix method. As can be seen from FIG. 13, the experimental and theoretical curves are in excellent agreement, and the device of the above example has an ellipticity close to 1 for a wider wavelength range than an equivalent single layer quarter wave retarder (also shown in FIG. 13 as a standard QWP).

Embodiment 8

Figure 8:
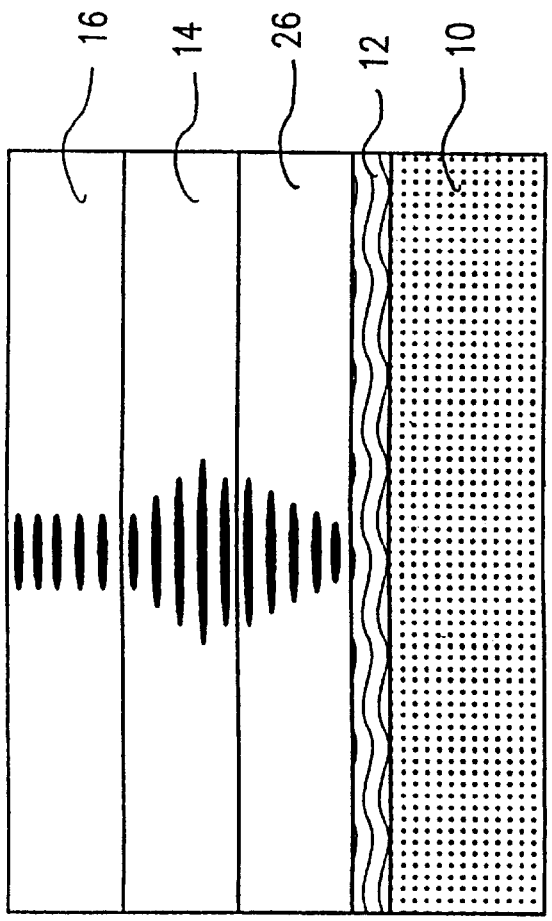
FIGS. 8 and 8A are schematic illustrations similar to those of FIGS. 1 and 1A of a further embodiment of optical device according to the present invention.
Figure 8A:
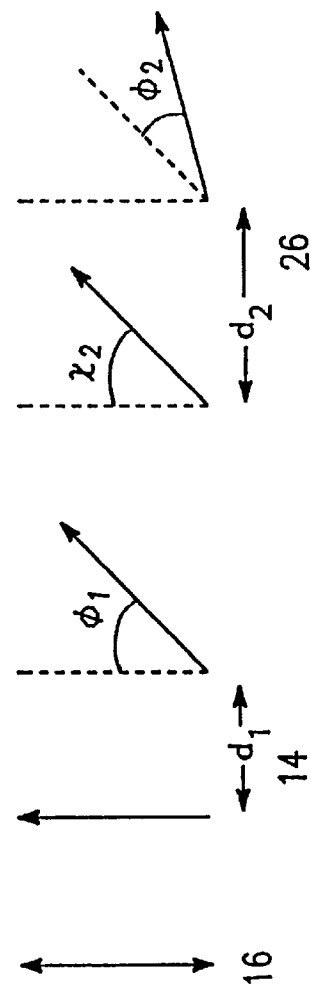

Referring now to FIGS. 8 and 8A, the optical device is similar to that of FIGS. 6 and 6A except that the layer 14 also provides alignment for the layer 16. Thus, the adjacent surface of the layer 26 aligns the layer 14 and the latter aligns the layer 16. It will thus be appreciated that all of the usual intermediate alignment layers which would normally be provided in a conventional device can be completely dispensed with, as can the substrate 22 with alignment layer 24. In an example of this embodiment, $\phi_1=30°$, $d_1=1650$ nm, $\chi_1=0°$, $\phi_2=84°$, $d_2=810$ nm and $\chi_2=\chi_1+\phi_1=30°$. In FIG. 8A, $\chi_1$ is not marked because it is 0°.

Embodiment 9

Figure 9:
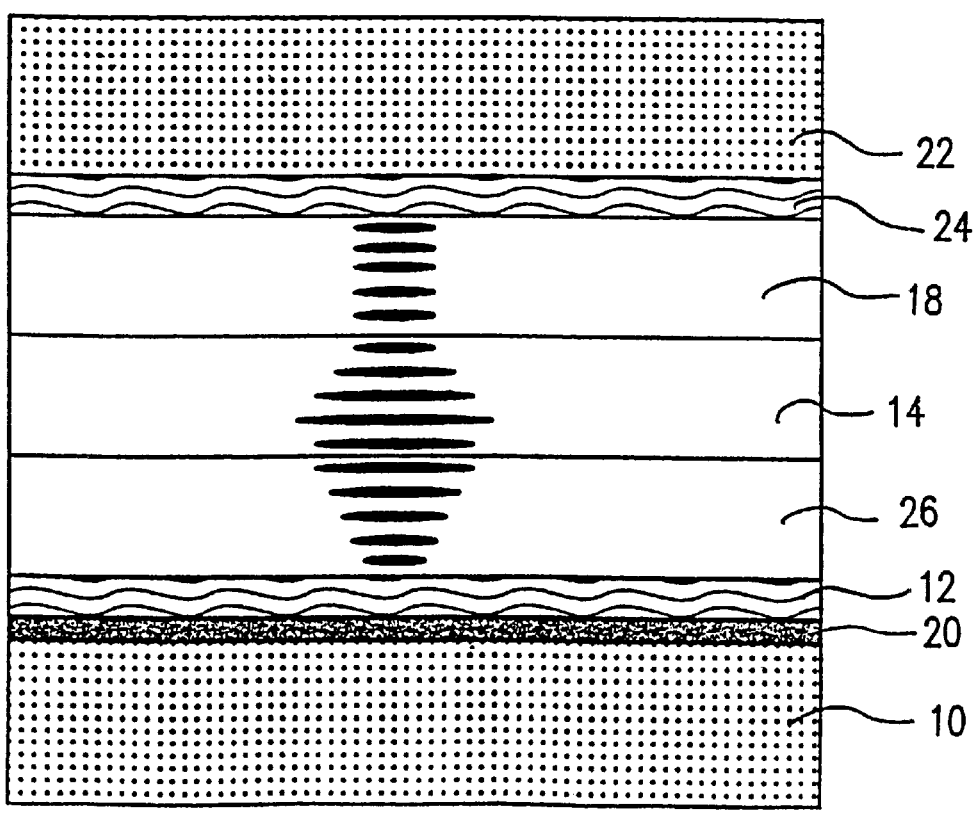
FIG. 9 is a schematic illustration showing the layer structures of another embodiment of optical device according to the present invention.

Referring now to FIG. 9, an arrangement similar to that of FIG. 8 is provided except that, in this case, anisotropic layer 16 acting as a linear polarizer is replaced by an active, dyed liquid crystal layer 18, and that substrate 22 with rubbed alignment layer 24 is also provided. As in the embodiment of FIG. 2, the substrate 22 is provided with means for applying an electric field to the layer 18.

Embodiment 10

Figure 10:
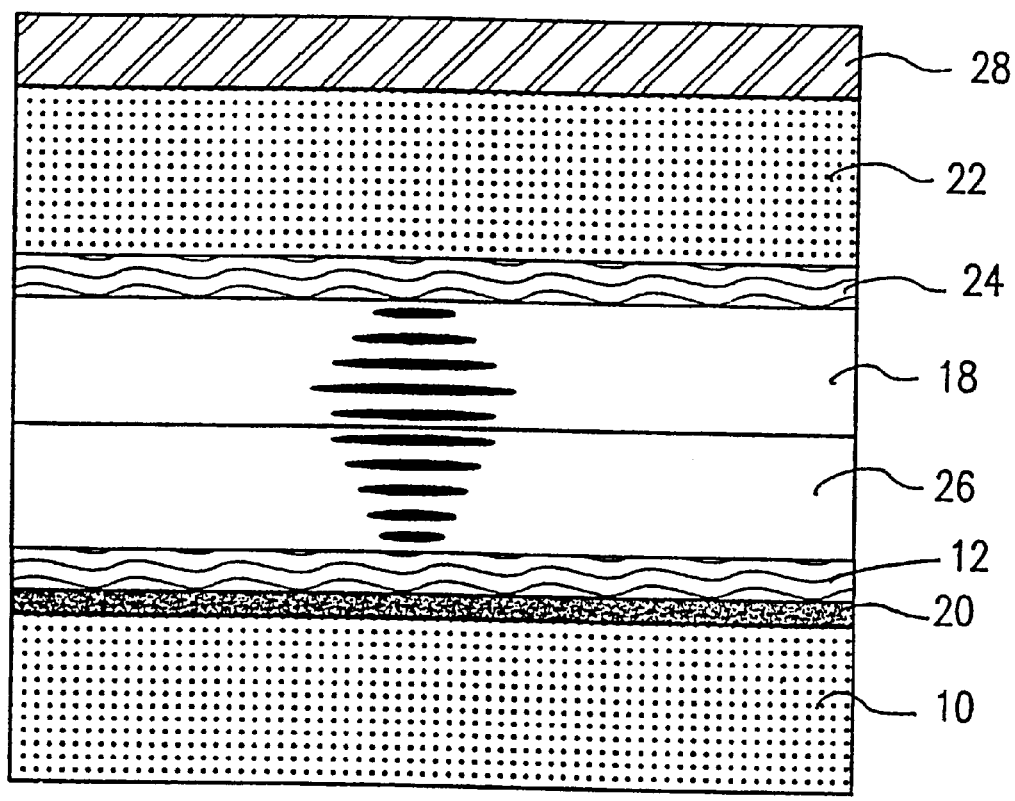
FIG. 10 is a schematic illustration showing the layer structures of another embodiment of optical device according to the present invention.

Referring now to FIG. 10, the device Illustrated therein is a switchable reflective mode device wherein switchable liquid crystal layer 18 is a twisted layer rather than being an untwisted layer as in the embodiment of FIG. 2. The device has reflector 20 and linear polarizer 28. The arrangement of the layers 18 and 26 may be similar to the above-described achromatic circular polarizer (i.e. FIGS. 6 and 8).

In a modification of the embodiment of FIG. 10, the roles of the layers 18 and 26 are reversed so that layer 26 becomes the active liquid crystal layer and the layer 18 becomes the passive, polymerized reactive mesogen layer.

In a further alternative, the device of FIG. 10 is modified so that it is a transmissive device. For this purpose, reflector 20 is omitted and replaced by a further polarizer outside the display.

It is also possible to combine three or more aligning retarder layers to produce a circular polarizer with further improved a chromaticity compared with the devices with two aligning layers. 14 and 16. It is further possible to combine twisted layers to produce polarization interference filters, such as Solc and Lyot filters.

In the case where one or more of the layers 14 and 26 is formed from reactive mesogens, the inherent pretilt can vary depending upon the nature of the reactive mesogen used. For diacrylate reactive mesogens, the pretilt angle is normally approximately zero. It is, however, within the scope of the present invention to vary the surface pretilt of a diacrylate by adding known quantities of monoacrylate. This forms the subject of our British Patent Application No. 9704623.9 filed on Mar. 6, 1997, whose disclosure is incorporated herein by reference. Thus, in one embodiment, a twisted retarder made from a mesogenic material is used to provide the desired alignment direction and pretilt for a subsequent layer. An example of the use of such a retarder is the dark/bright device described herein above in respect of FIG. 2 which is designed to operate in normally white mode. The quarter wave plate defined by the layer 14 is designed to have a very high pretilt at the aligning interface, and will align the liquid crystal almost homeotropically. The opposite surface of layer 18 also has a high pretilt so that, when no voltage is applied, the device will appear bright.

Embodiment 11

Figure 11:
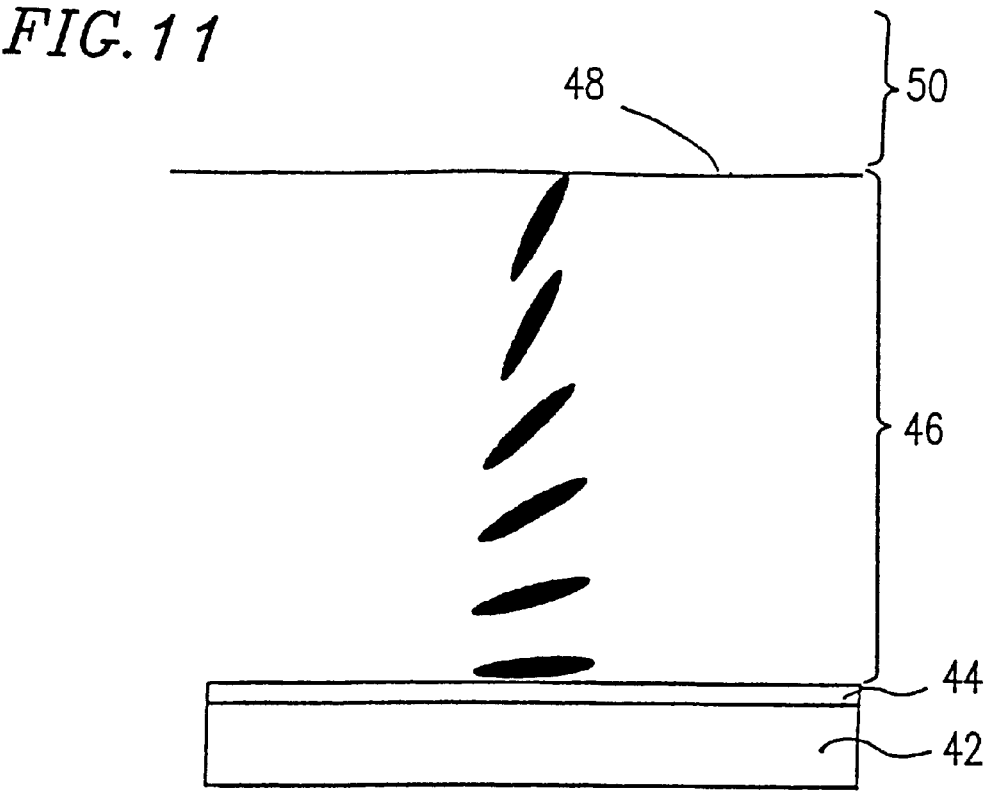
FIG. 11 is a view showing the layer structure of an optical device also according to the present invention with a relatively thick aligning retarder layer.
Figure 12:
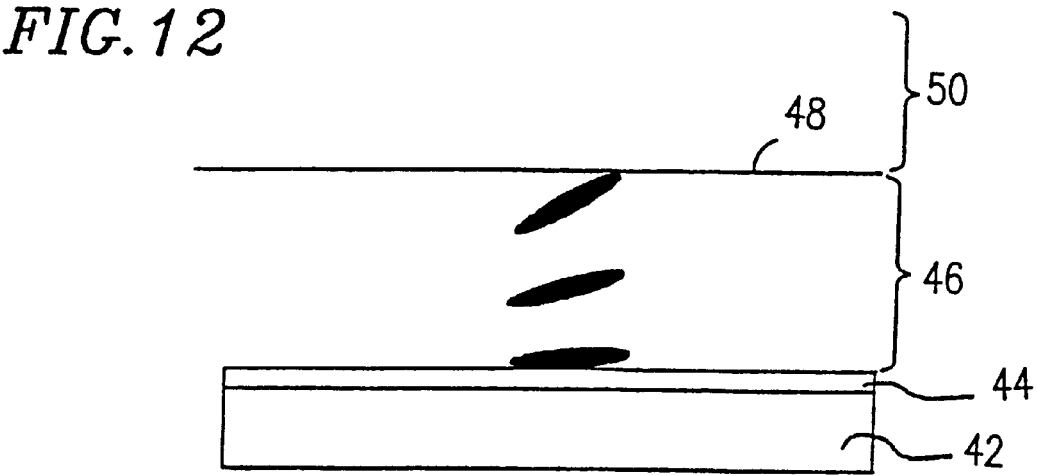
FIG. 12 is a view of a device similar to that of FIG. 11 but with a relatively thin aligning retarder layer.

Turning now to FIGS. 11 and 12. A high pretilt occurs in the optical device illustrated in FIG. 11 where there is shown an assembly of glass plate 42 (with electrode—not shown), alignment layer 44, and a liquid crystal layer 46 acting as a combined retarder and alignment layer. Glass plate 42, which is partly coated with a transparent electrode, e.g. of indium tin oxide (ITO), has a thin layer 44 of a polyimide spin coated onto it in a manner known per se. This polyimide layer 44 is rubbed to provide an alignment surface for liquid crystal layer 46. A mixture of a nematic liquid crystal material (for example E7 from Merck), chiral dopant (for example chiral dopant R1011 from Merck) and an acrylate-based material (for example RM82 from BDH Limited, RM253 from Merck or RM308 from Merck) is then spin coated as a thin (typically approximately 100 nm) layer 46 onto the rubbed polyimide surface 44. The twisted nematic component of the spun mixture is aligned by the surface of the underlying polyimide layer 44, and is pretilted at such surface by a small angle (typically about 3°). The other surface 48 of the layer 46 is a free surface and is kept under a nitrogen atmosphere. At the surface 48, the liquid crystal molecules adopt a high pretilt angle which is typically greater than 70°. Thus, the nematic component of the thin spun layer 46 tends to adopt a tilt which varies continuously throughout its thickness from the small pretilt angle defined at the surface of the underlying polyimide layer 44 to the much higher pretilt angle adopted at the surface 48. The actual pretilt angle adopted by the liquid crystal molecules at the gas/liquid crystal interface is dependent upon the type of liquid crystal, the type of gas and the presence of any external magnetic or electric fields etc. In addition, the pretilt angle at such interface will depend upon the proximity of the underlying polyimide layer 44 (i.e. on the thickness of the spun layer 46). As can be seen from FIG. 8, the thinner layer 46 produces a smaller pretilt angle at the surface Exposing the nematic/acrylate mixture to UV light induces the acrylate component to undergo a photochemical reaction to convert the low molar mass acrylate to a polymer. The polymer so formed acts to fix the orientation and tilt structure of the liquid crystal molecules in the layer 46 permanently. Thus, following UV illumination, a thin nematic/polymer layer 46 results having an exposed surface 48 in which at least some of the nematic molecules are fixed and pretilted at some angle which is determined by the thickness of the layer 46. Thus, the pretilt angle can be tuned as desired, and such layer can then be used to define one of the alignment surfaces 48 for an adjacent field switchable liquid crystal layer 50 (only partly shown). This may conveniently form part of a device as described in more detail in our British Patent Application No. 9613373.1.

Besides providing a pretilted alignment surface for the liquid crystal layer 50, the thin nematic/acrylate polymer layer 46 described in relation to FIGS. 11 and 12 is also inherently birefringent and thereby serves as an optical retarder. The combination of these features is advantageous in the device according to our British Patent Application No. 9613373.1.

Furthermore, the above-described alignment and retarding layers can be formed from a polymerizable discotic liquid crystal. As is well known in the art, this is advantageous in that such layers would then become useful as viewing angle compensation films for an LCD.

Additionally, in LCD devices which utilize plastic substrates, the plastic substrate could chosen so as to be anlsotropic, therefore functioning as a retarder. The anisotropic plastic substrate may have the ability to align liquid crystals on the inside of the device. Also the present invention can be used in conjunction with LCD devices which have internal polarizers.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical device comprising an anisotropic layer containing anisotropic molecules, and an alignment layer adjacent said anisotropic layer, said alignment layer serving to align the anisotropic molecules in an adjacent surface region of said anisotropic layer, wherein the alignment layer incorporates a twisted molecular structure so as to define a twisted optical retarder, the twisted molecular structure being provided by incorporating at least one of chiral molecules, chiral dopant and polymerized reactive mesogens having a twist, into the alignment layer.

2. An optical device as claimed in claim 1, wherein the twisted molecular structure is provided by incorporating chiral molecules into the alignment layer.

3. An optical device as claimed in claim 1, wherein the twisted molecular structure is provided by incorporating a chiral dopant into the alignment layer.

4. An optical device as claimed in claim 1, wherein the alignment layer comprises polymerized reactive mesogens having a twist.

5. An optical device as claimed in claim 4, wherein the alignment layer is formed from polymerized reactive mesogens having different polymerization functionalities.

6. An optical device as claimed in claim 5, wherein the reactive mesogens comprise a mixture of mono- and di-functional polymerizable liquid crystals.

7. An optical device as claimed in claim 1, wherein the anisotropic layer is a liquid crystal layer.

8. An optical device as claimed in claim 7, herein the liquid crystal layer contains a chiral moiety.

9. An optical device as claimed in claim 7, wherein the liquid crystal layer contains a dichroic dye.

10. An optical device as claimed in claim 7, wherein the liquid crystal layer is a layer in which the liquid crystal molecules are fixed.

11. An optical device as claimed in claim 7, wherein the liquid crystal layer is a layer in which the liquid crystal molecules are moveable in response to changes in a field applied thereto.

12. An optical device as claimed in claim 11, further including means for applying a field to the liquid crystal layer.

13. An optical device as claimed in claim 1, wherein the anisotropic layer is a layer in which the anisotropic molecules are fixed.

14. An optical device as claimed in claim 1, wherein the anisotropic layer is a layer in which the anisotropic molecules are moveable in response to changes in a field applied thereto.

15. An optical device as claimed in claim 1, wherein the anisotropic layer is a further alignment layer.

16. An optical device as claimed in claim 15, wherein a further anisotropic layer is provided over said further alignment layer and is aligned by said further alignment layer.

17. An optical device as claimed in claim 15, wherein said further alignment layer is arranged to act as an optical retarder.

18. An optical device as claimed in claim 1, wherein molecules of the twisted molecular structure at opposite surfaces of the alignment layer have different pre-tilt angles.

19. An optical device as claimed in claim 1, further including means for applying a field to the anisotropic layer.

20. An optical device as claimed in claim 1, further including a polarizer disposed on at least one side of the anisotropic layer.

21. An optical device as claimed in claim 1, further including a reflector.

* * * * *